Patented Aug. 10, 1948

2,446,737

UNITED STATES PATENT OFFICE 2,446,737

MANUFACTURE OF YEAST

Firmin Boinot, Melle, and Jean Boige, La Noblette-Melle, France, assignors to Les Usines de Melle (Societe Anonyme), Saint - Leger - les - Melle, France, a company of France No Drawing. Application May 16, 1945, Serial No. 594,156. In France September 17, 1943

3 Claims. (Cl. 195—102)

It is known that yeast is produced by large amounts in industry from sugars or from various carbohydrates. As the methods in use are well known, we shall not make a detailed description of them. However, we might remind that one generally performs "successive breedings or growths," the number of breedings being limited to three in actual practice. The original content of glucids in the medium decreases from the first breeding to the third. As an example, one uses:

For the first breeding: 100 kgs. of molasses diluted to a total volume of 1,700 litres.

For the second breeding: 100 kgs. of molasses diluted to a total volume of 2,000 litres.

For the third breeding: 100 kgs. of molasses diluted to a total volume of 3,000 litres.

After all fermentable glucids in the first breeding have disappeared, yeast is extracted according to known processes and wholly used in the second breeding. Likewise, yeast from the second breeding separated in the same manner after thorough disappearance of fermentable glucids, is wholly used for the third breeding. It is only after thorough disappearance of all fermentable glucids from the third breeding solution that yeast is finally extracted for further use.

It will thus be realized that an essential character of the prior method is the feature of carrying yeast proliferation in each breeding, so far as complete disappearance of available glucids takes place.

The yields in such process vary from 130 to 150 kgs. of pressed yeast containing 72 per cent of moisture for 100 kgs. of glucids available in the breeding medium.

It is an object of our invention to provide an improved method whereby yeast yields are considerably increased.

According to this invention, we periodically extract from the breeding medium yeast produced therein before glucids have wholly disappeared, and we re-use for a new growth of cells, after each periodic yeast removal, the liquid so freed from yeast. The number of successive re-uses of said liquid is not limited a priori and sometimes may be larger than four.

The following example which has no limitative character will better show how this invention may be carried out.

*Example.*—Milk serum which might be sterilised or not and to which might be added nutrient elements, was seeded with 10 per cent of a yeast leaven separately prepared. The medium was subjected with the usual means to a strong aeration until cell concentration mounted to about 600 millons of cells per cubic centimeter. Yeast was then extracted as usual, for instance through centrifugalisation.

1 per cent of the yeast thus collected was restored to the medium freed from yeast, further nutrient elements containing nitrogen or phosphates being added to said medium if need be. We again aerated as above mentioned until a new cell concentration equivalent to the first one was reached.

We then removed yeast newly produced, we again seeded the liquid freed from yeast with 1 per cent of said yeast, and we proceeded with a third growth in the above mentioned conditions.

The successive treatments were repeated as long as yeast crop was deemed sufficiently profitable, and at least until all glucids had wholly disappeared. In certain cases it may be of advantage to effect a last growth of yeast in the liquid even though an analysis shows no longer any available glucids in the medium.

The yeast yield reached 300 kgs. of pressed yeast having a moisture content of 72 per cent, for 100 kgs. of glucids in the original milk serum.

It is possible to bring about detail alterations in our method as above set forth without departing from the spirit of our invention.

Thus instead of returning 1 per cent of yeast as a seeding medium to the liquid freed from yeast, we may leave on purpose the corresponding amount of cells in said liquid, for instance by suitably controlling the rate of centrifugalisation in order that the required weight of yeast be removed with the liquid free from yeast.

It is also possible to vary the cell concentration to be reached in each growth before yeast extraction, as well as the amounts of yeast re-introduced in the successive liquids freed from yeast and the manner of seeding said liquids with newly produced yeast.

Again, although milk serum mentioned as an example is particularly advantageous in carrying out our method, our invention is not confined to the use of this starting material as it is generally applicable to any and all liquids containing fermentable glucids, particularly sugar solutions from cellulose saccharification.

Still again, while we have set forth that yeast extraction was effected when cell concentration amounted to about 600 millions of cells per cubic centimeter (i. e. a weight percentage which for the same cell concentration, may vary from 2 per cent of yeast having a 72 per cent moisture content to 3 per cent or more, according to the cell size), it is also possible to perform extraction when different percentages are reached. Likewise, the proportion of 1 per cent of yeast introduced before each new growth has no limitative character; thus for instance, a three or four times smaller percentage may be chosen without any detriment, whatever the glucid content may be at the time when fresh yeast is seeded. The point at which yeast should be removed is reached more or less shortly according as seeding has been more or less copious. Finally, it is not necessary that the amount of yeast for a new growth be an aliquot part of a foregoing crop. Seeding yeast may as well be produced from other media such as beetroot juices, molasses solutions and generally speaking any liquids containing glucids assimilable by yeasts.

In short, any method for the manufacture of yeast wherein yeast as produced is periodically removed from the medium before whole disappearance of glucids available therein, lies within the scope of our invention.

What we claim is:

1. A process for the production of yeast in a sugar containing nutrient medium, which comprises the successive steps of adding yeast to said medium in a proportion considerably less than 2 per cent by weight, the amount of yeast being reckoned in terms of yeast containing 72 per cent of moisture; propagating said yeast in said medium until the yeast concentration has risen to about 2–3 per cent by weight, so that the medium still contains a fraction of its original sugar content; removing said yeast from said medium; adding yeast to said medium having its substantially unaltered sugar fraction content, in a proportion not substantially above 0.02 to 0.03 per cent by weight; propagating said newly added yeast in said medium until the yeast concentration has risen to about 2–3 per cent by weight; removing said yeast from said medium; and repeating the same sequences of yeast addition, yeast propagation and yeast removal, until no sugars can be detected through analysis in the yeast freed medium.

2. A process for the production of yeast in a sugar containing nutrient medium which comprises seeding said medium with yeast in a proportion considerably less than 2 per cent by weight, the amount of yeast being reckoned in terms of yeast containing 72 per cent of moisture; propagating said yeast in said medium up to complete consumption of the sugar content of said medium; and reducing the yeast content of said medium to a proportion of about 0.02 to 0.03 per cent for future propagation, whenever and as many times as the yeast proportion has risen to about 2–3 per cent by weight, while propagation proceeds.

3. The process of claim 2, the yeast proportion restoration step consisting of removing the excess of yeast over 0.02 to 0.03 per cent from said medium, so as to leave behind only 0.02–0.03 per cent yeast for the next propagation.

FIRMIN BOINOT.
JEAN BOIGE.

REFERENCES CITED

The following references are of record in the file of this patent:

UNITED STATES PATENTS

| Number | Name | Date |
|---|---|---|
| 1,676,437 | Harrison | July 10, 1928 |
| 1,722,746 | Hasling | July 30, 1929 |
| 2,035,048 | Daronyi | Mar. 24, 1936 |

FOREIGN PATENTS

| Number | Country | Date |
|---|---|---|
| 275,328 | Great Britain | Aug. 4, 1927 |

OTHER REFERENCES

Hackh's Chemical Dictionary, 3rd edition, pages 379 and 167. The Blakiston Co.